(12) United States Patent
Rammell et al.

(10) Patent No.: US 11,275,532 B1
(45) Date of Patent: Mar. 15, 2022

(54) DIGITAL PRINTING AUXILIARY SYSTEM AND RELATED METHODS

(71) Applicant: Raspberry Creek Fabrics, LLC, Sandy, UT (US)

(72) Inventors: Justin Rammell, Sandy, UT (US); Mitko Mitev, Corvallis, OR (US)

(73) Assignee: Raspberry Creek Fabrics, LLC, Sandy, UT (US)

( * ) Notice: Subject to any disclaimer, the term of this patent is extended or adjusted under 35 U.S.C. 154(b) by 0 days.

(21) Appl. No.: 17/344,679

(22) Filed: Jun. 10, 2021

(51) Int. Cl.
*G06F 3/12* (2006.01)

(52) U.S. Cl.
CPC .......... *G06F 3/1205* (2013.01); *G06F 3/1268* (2013.01)

(58) Field of Classification Search
CPC combination set(s) only.
See application file for complete search history.

(56) References Cited

U.S. PATENT DOCUMENTS

| | | | | |
|---|---|---|---|---|
| 2010/0302592 | A1* | 12/2010 | Nishikawa | G06F 3/1241 358/1.16 |
| 2014/0240787 | A1* | 8/2014 | Varga | G06K 15/1809 358/2.1 |
| 2015/0242164 | A1* | 8/2015 | Takeuchi | G06F 3/1285 358/1.14 |
| 2018/0035006 | A1* | 2/2018 | Bermundo | G06F 3/1285 |
| 2019/0058801 | A1* | 2/2019 | Imamura | G06F 3/1286 |
| 2021/0122170 | A1* | 4/2021 | Perdicaro | B41J 11/42 |

* cited by examiner

*Primary Examiner* — Helen Zong
(74) *Attorney, Agent, or Firm* — Quarles & Brady LLP

(57) ABSTRACT

A method for digital printing to reduce a printing image file size. The method may include receiving a plurality of printing orders, a printing order including a base image and printing size information; generating a plurality of raster image processor (RIP) orders corresponding to the printing orders; obtaining a plurality of printing jobs corresponding to the plurality of RIP orders; modifying the plurality of printing jobs such that a printing size of each printing job of the plurality of printing jobs is adjusted based on a size of the base image of the printing order corresponding to a respective printing job of the plurality of printing jobs and the base image of the printing order is repeated based on the printing size information of the printing order; and transmitting the modified plurality of printing jobs to one or more printers. Other aspects, embodiments, and features are also claimed and described.

24 Claims, 5 Drawing Sheets

DIGITAL PRINTING AUXILIARY SYSTEM AND RELATED METHODS

TECHNICAL FIELD

The technology discussed below relates generally to digital printing systems, and more particularly, to a digital printing auxiliary system to reduce a printing image file size.

BACKGROUND

Conventional digital printing systems generally exploit a small size of printing substrate (e.g., paper). As printing technologies advanced, the demand for printing on a large size of printing substrate (e.g., fabric) increases. When conventional digital printing systems use a small size of printing substrate, a printer may have enough memory capacity to load a printing image on the printing substrate. However, as the printing size linearly increases, the file size of the printing image exponentially increases. The exponentially increased file size may result in errors at the printer because the memory capacity for printing is limited and may not be sufficient for the exponentially increased file size. What are needed are systems and methods that address one or more of these shortcomings.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one example, a method for digital printing is disclosed. The method includes receiving a plurality of printing orders. A printing order of the plurality of printing orders may include a base image and printing size information. The method further includes generating a plurality of raster image processor (RIP) orders corresponding to the plurality of printing orders and obtaining a plurality of printing jobs corresponding to the plurality of RIP orders. The plurality of printing jobs may be generated from a RIP software. The method further includes modifying the plurality of printing jobs such that a printing size of each printing job of the plurality of printing jobs is adjusted based on a size of the base image of the printing order corresponding to a respective printing job of the plurality of printing jobs and the base image of the printing order is repeated based on the printing size information of the printing order. The method, then, further includes transmitting the modified plurality of printing jobs to one or more printers.

In another example, a method for digital printing includes receiving a plurality of printing orders. A printing order of the plurality of printing orders may include a base image and printing size information. The method further includes: transmitting the plurality of printing orders to a printing management system generating a batch based on the plurality of printing orders; generating a plurality of raster image processor (RIP) orders corresponding to the plurality of printing orders based on the batch; and obtaining a plurality of printing jobs corresponding to the plurality of RIP orders. The plurality of printing jobs may be generated from a RIP software. The method further includes modifying the plurality of printing jobs such that a printing size of each printing job of the plurality of printing jobs is adjusted based on a size of the base image of the printing order corresponding to a respective printing job of the plurality of printing jobs and the base image of the printing order is repeated based on the printing size information of the printing order. The method, then, further includes transmitting the modified plurality of printing jobs to one or more printers.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Figure 1:
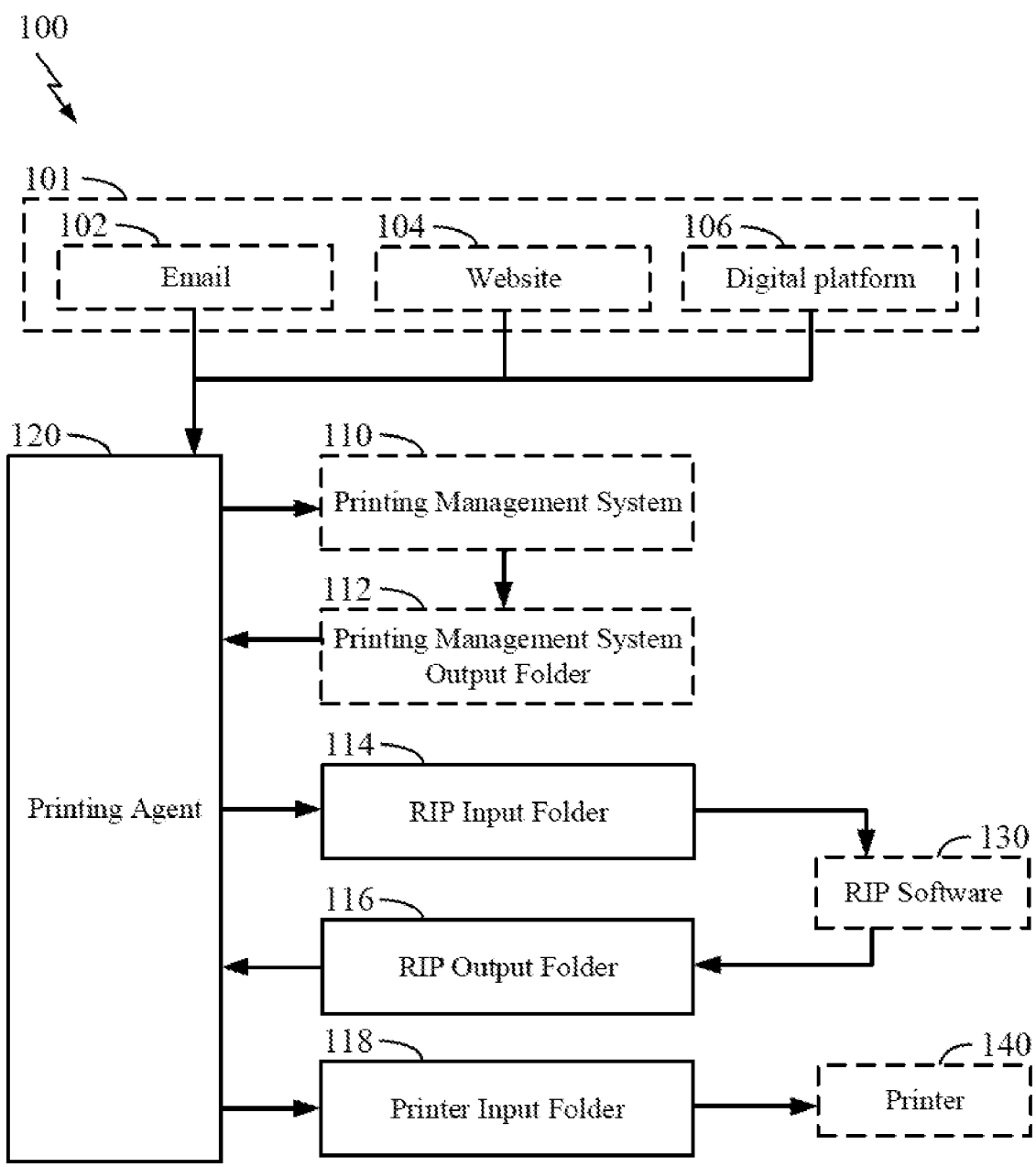
FIG. 1 is a conceptual illustration of an example of a digital printing system according to some embodiments.

FIG. 1 is a conceptual illustration of an example of a digital printing system 100 according to an aspect of the disclosure. The digital printing system 100 may include an external ordering system 101, a printing management system 110, a printing agent 120 (e.g., a printing auxiliary system), a raster image processor (RIP) software 130, and a printer 140. In some examples, the printing agent 120 may receive a plurality of printing orders from the external ordering system 101. A printing order of the plurality of printing orders may include a base image and printing size information. The printing agent 120 may transmit the plurality of printing orders to a printing management system 110. The printing management system 110 may generate a batch based on the plurality of printing orders. The printing agent 120 may generate a plurality of RIP orders corresponding to the plurality of printing orders based on the batch. This automatic break-down process without human intervention may reduce error rates and printing overhead because the batch is generally processed as a whole. The RIP software 130, then, may obtain the plurality of RIP orders and produce a plurality of printing jobs corresponding to the plurality of RIP orders. The printing agent 120 may obtain a plurality of printing jobs corresponding to the plurality of RIP orders. The plurality of printing jobs may be generated from the RIP software 130. The printing agent 120 may modify the plurality of printing jobs such that a printing size of each printing job of the plurality of printing jobs is adjusted based on a size of the base image of the printing order corresponding to a respective printing job of the plurality of printing jobs and the base image of the printing order is repeated based on the printing size information of the printing order. The printing agent 120 may transmit the modified plurality of printing jobs to the printer 140. The printer 140, then, may perform printing with reduced print image file sizes due to the modified plurality of printing jobs. That is the printer 140 does not need to load the whole size of a printing image which is full of base images into a memory space in the printer 140 as a whole. At the same time, the substantially reduced size of the printing image may also reduce error rates because of the reduced size of the printing image and reduced time to load the printing image to the memory space. The block diagram in FIG. 1 and its description below may show one or more examples of this implementation.

In some examples, one or more users may exploit the external ordering system 101 to provide a plurality of printing orders to the digital printing system 100. A printing order may include printing size information. The printing size information may include the total size of a printing image to be printed. The printing image is the whole image a user wants to print. In some examples, the printing size information may include a width and/or length of the total size of the printing image. In some examples, a user may provide the width and/or length of the total size of a printing image on which the user wants to print. In other examples, a user may only provide the width or length of the printing image to be printed. In that case, the length or width which the user does not provide may be fixed or determined based on the size of a printing substrate (e.g., fabric, paper, or any other suitable printing substrate). For example, if a fabric roll (40 inches wide×5 yards long) is used for printing and a user provides printing size information only with length information (80 inches long) for a printing image, the digital printing system 100 may automatically determine the printing width as the width of the fabric roll, which is 40 inches. However, it should be appreciated that the printing size information is not limited to this example. In other examples, a user may provide a number of base image repetitions in width and length. Based on the provided number of base image repetitions, the printing agent 120 may calculate the width and length of the total size to be printed. For example, a user may provide printing information, 2 repetitions of a base image in width and 8 repetitions of the base image in length. If the base image is 10 inches wide and 10 inches long, the digital printing system 100 may determine the total size as 20 inches wide and 80 inches long.

A printing order may further include a base image to be printed along with the printing size information. In some examples, the base image may include a base image file and/or base image size information. The base image may be repeated on a printing substrate based on the base image size information and the printing size information. The base image size information may include a width and length of the base image file. In some examples, the base image size information may be explicit or implicit. In some examples, the base image size information may be in metadata of the base image file. In some examples, the base image size information may be alternatively or additionally calculated from the base image file. In some examples, the base image file may be any suitable type of an image file. For example, the base image may be a vector file including, but not limited to, a Joint Photographic Experts Group (JPEG) file (e.g., a .jpg file), a Portable Network Graphic (PNG) file (e.g., a .png file), a Tag Image File Format (TIFF) file (e.g., a .tiff file), a Portable Document Format (PDF) file (e.g., a .pdf file), a Photoshop Document (PSD) file (e.g., a .psd file), an Adobe Illustrator file (e.g., a .ai file), or an InDesign file (e.g., a .indd file). However, it should be appreciated that the base image may be any other suitable image file type, which at least one of the printing agent 120, the RIP software 130, or the printer 140 is capable of processing.

In some examples, a base image may include one or more patterns such that the base image can be seamlessly repeated on a printing substrate. For example, a base image may have four sides: a first side (e.g., a horizontal side), a second side (e.g., a vertical side), a third side (e.g., an opposite side to the first side), and a fourth side (e.g., an opposite side to the second side). For the seamless repetition, the first side of the base image may be identical to or a continuation of the third side of the base image, and the second side may be identical to or a continuation of the fourth side image. In other examples, the first side of the base image may not be identical to the third side. Another base image next to the base image may be flipped around 180 degrees such that the first side of another base image may meet the first side of the base image. For example, the first side of a first base image may meet the first side of a second base image next to the first base image, the third side of the second base image may meet the third side of a third base image next to the second base image. In other examples, the base image may be reproduced with a drop of the base image. The drop is either a distance or a fraction in connection with a base image. For example, the third side of a first base image may correspond to a first half (a ½ vertical drop) of the first side of a second base image and a second half of the first side of a third base image. However, it should be appreciated that a pattern of the base image is not limited to the examples above. A pattern of the base image may be any other suitable pattern, which at least one of the printing agent 120 or the RIP software 130 may seamlessly arrange the base image on the printing substrate.

A printing order may additionally include a type of a printing substrate. In some examples, the type of the printing substrate may be a specific fabric, a specific type of paper, or any other suitable type of the printing substrate. For example, the type of the printing substrate may include, but is not limited to, 10 oz. 95/5 Cotton Spandex Jersey, 12 oz. 95/5 Cotton, Spandex Jersey and 13 oz. 95/5 Cotton Spandex French Terry. However, it should be appreciated the type of the printing substrate may be any other suitable substrate to be printed. The plurality of printing orders may be categorized based on the type of the printing substrate. For example, the digital printing system 100 may categorize a first set of the plurality of printing orders having a first printing substrate and a second set of the plurality of printing orders having a second printing substrate. Then the digital printing system 100 may print the first set of the plurality of printing orders on the first printing substrate and the second set of the plurality of printing orders on the second printing substrate.

In an aspect of the disclosure, the printing agent 120 may receive the plurality of printing orders from the external ordering system 101. In some examples, the printing agent 120 may receive necessary information from the external ordering system 101 and generate the plurality of printing orders. The external ordering system 101 may include an email system 102, a website 104, a digital platform 106, or any other suitable medium to provide a printing order to the digital printing system 100. Different types of systems in the external ordering system 101 may provide the same types of data and files to the printing agent 120. In some examples, the systems 102, 104, 106 in the external ordering system 101 may provide printing size information and/or types of printing media in a different format. The printing agent 120, then, may modulate the received printing size information and/or types of printing media from the different systems 102, 104, 106 in a uniform format to communicate with the printing management system 110, the RIP software 130, and/or the printer 140.

The printing agent 120 may transmit the plurality of printing orders to the printing management system 110 to generate a batch based on the plurality of printing orders. In some examples, the printing agent 120 may transmit the plurality of printing orders to the printing management system 110 by placing the plurality of printing orders in a certain memory space (e.g., printing management system input folder). The printing management system 110 may be able to access the memory space and process data on the memory space. The printing management system 110 may combine the plurality of printing orders and generate a batch based on the plurality of printing orders. The printing management system 110 may generate the batch based on the plurality of printing orders. In some examples, the printing management system 110 may generate a batch based on a respective printing substrate type of each printing order of the plurality of printing orders. For example, the printing agent 120 may transmit 10 printing orders (4 printing orders using 95/5 Cotton Spandex Jersey and 6 printing orders using 95/5 Cotton Spandex French Terry) to the printing management system 110. The printing management system 110 may generate a first batch combining 4 printing orders using 95/5 Cotton Spandex Jersey and generate a second batch combining 6 printing orders using 95/5 Cotton Spandex French Terry. The printing management system 110 may transmit the one or more batches to the printing agent 120. In some examples, the printing management system 110 may place the batch to a certain memory space (e.g., a printing management system output folder 112). The printing agent 120 may receive or access the batch generated by the printing management system 110.

The printing agent 120 may generate a plurality of RIP orders corresponding to the plurality of printing orders based on the batch. In some examples, a RIP order may include a corresponding printing order and order configuration information about the corresponding printing order. The order configuration information may use a markup language to communicate with other homogeneous or heterogeneous systems. However, it should be appreciated that the order configuration information may use any suitable programming language. In some examples, the markup language may be the eXtensible Markup Language (XML). However, the markup language is not limited to an XML. It may be the Standard Generalized Markup Language (SGML), the Hypertext Markup Language (HTML), the eXtensible Hypertext Markup Language (XHTML), or any other suitable markup language to provide the order configuration information to other systems. In some examples, the printing agent 120 may place the plurality of RIP orders on a certain memory space (e.g., RIP input folder 114) for the RIP software to read and process the plurality of RIP orders. In other example, the printing agent 120 may transmit the plurality of RIP orders to the RIP software 130 via a wired or wireless network.

The RIP software 130 may obtain the plurality of RIP orders and generate a plurality of printing jobs corresponding to the plurality of RIP orders. A printing job may include, but is not limited to, a raster image and RIP configuration information. The RIP software 130 may convert the base image in a RIP order with/without copies of the base image into a raster image which a printer 140 can read and process. The raster image may include several images having corresponding colors. That is, each image of the several images may have one color which is extracted from the base image. For example, a base image may include a picture which includes various colors. The RIP software 130 may separate the mixed and various colors in the base image into separate color images (black, cyan, magenta, yellow, red, and green). Thus, the RIP software 130 may convert the base image into 6 different images. One image only includes the black color of the base image. Another only includes the cyan color of the base image. Another only includes the magenta color of the base image. Another only includes the yellow color of the base image. Another only includes the red color of the base image. The other image only includes the green color of the base image. The converted image may be a halftone image. It should be appreciated that the conversion process is not limited to this example. For example, the number of separated colors may be more or less than 6 colors used as an example above. In some examples, the RIP software 130 may generate a raster image which size is the printing size in the corresponding printing order. That is, the raster image may include repeated base images with the size a user wants to print.

In some examples, the RIP configuration information may contain information about a printing job. The printer 140 may read the RIP configuration information and understand the printing job. For example, the RIP configuration information may include, but is not limited to, base image information, printing size information, and/or color information. The base image information may include the base image, the size of the base image, and/or the type of the base image of the corresponding printing order. The base image information may include, but is not limited to, a base image file, a width and length of the base image file, and/or a type of the base image file (e.g., JPEG, PNG, TIFF, PDF, PSD, AI, or INDD). The printing size information may include a width and length of a printing size that a user wants to print. The color information may include color separation information with various colors (e.g., black, cyan, magenta, yellow, red, green, and/or lightblack). The RIP configuration information may use a markup language to communicate with other homogeneous or heterogeneous systems. However, it should be appreciated that the RIP configuration information may use any suitable programming language. In some examples, the markup language may be the eXtensible Markup Language (XML). However, the markup language is not limited to an XML. It may be the Standard Generalized Markup Language (SGML), the Hypertext Markup Language (XHTML), the eXtensible Hypertext Markup Language (XHTML), or any other suitable markup language to provide the RIP configuration information to the printer 140. In some examples, the RIP software 130 may place a printing job to a certain memory space (e.g., a RIP output folder 116) where the printer 140 may access and process the printing job. In a certain embodiment, the RIP output folder 116 where the RIP software may place a printing job may be the same as a printer input folder 118 where the printer 140 may access and process the printing job. In another embodiment, the RIP output folder 116 where the RIP software may place a printing job may not be the same as a printer input folder 118 where the printer 140 may access and process the printing job. In that case, the printing agent 120 or any other suitable system entity may move the printing job to the printing input folder 118.

In some examples, the printing agent 120 may modify the plurality of printing jobs such that a printing size of each printing job of the plurality of printing jobs is adjusted based on a size of the base image of the printing order. A printing job may correspond to a respective printing order of the plurality of printing orders. The printing job may include the base image and the printing size information of a corresponding printing order. In some examples, the printing agent 120 may modify the printing job by modifying the RIP configuration information of the printing job. In some examples, the printing agent may access a printing job at a memory space (e.g., a RIP output folder in which the RIP software 130 may produce a plurality of printing jobs) and a markup language file (e.g., an XML file) of the printing job. The markup language file may include the RIP configuration information of the printing job.

By modifying the RIP configuration information, the base image may be repeated based on the printing size information of the printing job. In some examples, the printing size of the printing job may be reduced to the size of the base image of the printing job. In other example, the printing agent 120 may not modify the printing size information. In that example, the printing agent 120 may add repetition information about how many the base image is repeated. That repetition information may include the number of repetitions in width and length. In some examples, the printing agent 120 may enable a repetition mode (e.g., a step & repeat function). The printer 140, then, may automatically calculate the number of repetitions in width and length based on the printing size information. The base image of the printing order may be repeated to the printing size of the printing job. That is, the number of repetitions of the base image of the printing order may correspond to the printing size of the printing job. In some examples, the printing agent 120 may determine the number of repetitions in width and length of the base image for the base image to be filled in the printing size of the printing job. For example, if the base image size is 4 inches wide and 4 inches long and the printing size of a printing job is 6 inches wide and 12 inches long, the printing agent 120 may determine 1.5 repetitions in width and 3 repetitions in length. The printing agent 120, then, may add or modify the determined repetition information in the RIP configuration information. In some examples, the printing agent 120 may enable a textile mode in the RIP configuration information for seamless repetitions of a base image. In some examples, the printing agent 120 may set drop information in the RIP configuration information. The drop is either a distance or a fraction in connection with a base image. For example, a ⅓ vertical drop may indicate that the next repetition of a base image may be placed right next to the previous pattern with a drop of a third down of the base image. The printing agent 120 may determine a number of drops (e.g., ½, ⅓) and a direction (e.g., horizontal or vertical) for seamless repetitions of the base image. In some examples, a user may indicate the drop information through the external ordering system 101.

With the modification of the printing job, the printing size to be loaded in a memory space of the printer 140 may be substantially reduced to the base image with the repetition information of the base image. That is, the printer 140 does not need to load the whole size of a printing image which is full of base images into a memory space in the printer 140 as a whole. At the same time, the substantially reduced size of the printing image may also reduce error rates when the printer 140 coupled with a processor loads the printing image to a memory space to print. The error may be caused by the size of the printing image, the time to load the printing image to a memory space, and/or any other suitable reasons. In some examples, the printing image without reducing the size may be too big to be loaded in the memory space to print. In some examples, an unreduced printing image file may require an unacceptable and/or undesirable time to load the printing image to the memory space. During that long period of time, other interferences including other printing jobs to the printer 140 may prevent the printer 140 from processing the printing job and cause an error to the printing job.

In other examples, the printing agent 120 may perform the modification before the printing agent 120 provides a plurality of RIP orders to the RIP software 130. The printing agent 120 may modify order configuration information of a RIP order to reduce the size of the printing image with a repetition function. The RIP software 130, then, may obtain the modified order configuration information and generate a modified printing job. That is, a size of the raster image in the modified printing job is reduced to a base image of the printing job or the corresponding printing order.

In some examples, the printing agent 120 may transmit the modified plurality of printing jobs to the printer 140. In some examples, the printing agent 120 may move the modified plurality of printing jobs to a memory space. In some examples, the printing agent 120 may transmit the modified plurality of printing jobs based on the type of a printing substrate which each of the printing jobs includes. The printer may be one or more printers 140. The printing agent 120 may place the modified printing job in a different memory space (e.g., a printer input folder 118 in which the printer 140 may access and process files). In other examples, the printing agent 120 may not move or place the modified printing job to a different memory space. That is, the printer input folder 118 and the RIP output folder 116 may be at the same memory space.

Figure 2:
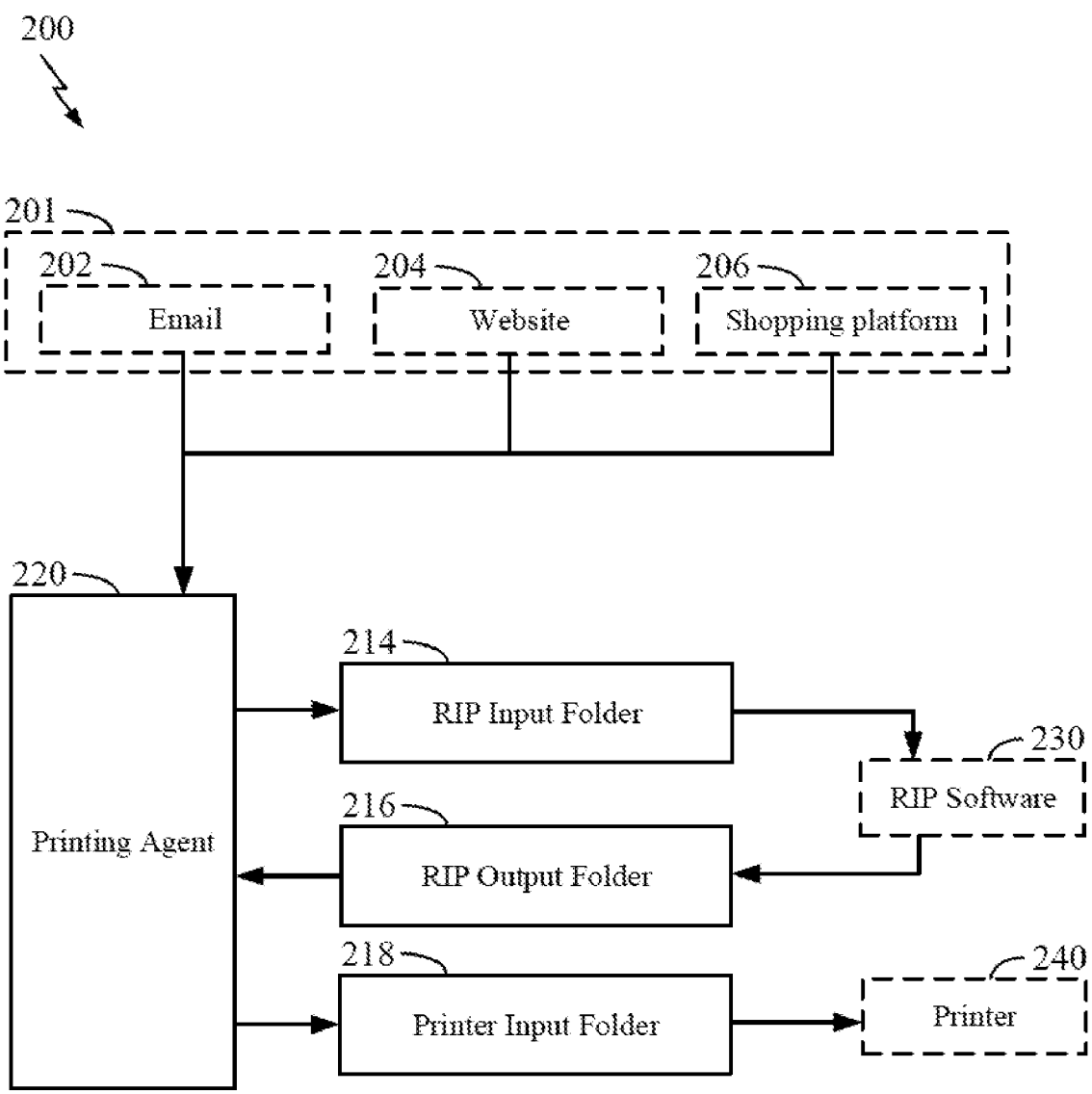
FIG. 2 is a conceptual illustration of another example of a digital printing system according to some embodiments.

FIG. 2 shows a conceptual illustration of another example of a digital printing system 200 according to an aspect of the disclosure. The digital printing system 200 may include an external ordering system 201, a printing agent 220, a raster image processor (RIP) software 230, and a printer 240. In this example, the digital printing system 200 may not include a printing management system 110. Instead, the printing agent 220 may receive a plurality of printing orders directly from the external ordering system 201. Based on the plurality of printing orders, the printing agent 220 may generate a plurality of corresponding RIP orders for a RIP software 230 to process the plurality of printing orders. A RIP order may include a base image, printing size information, and/or a type of a printing substrate of a corresponding printing order of the plurality of printing orders. The RIP order may further include order configuration information for the RIP software 230 to read and understand the RIP order. The order configuration information may include information about the RIP order including, but not limited to, base image information (e.g., a base image, a size of the base image, a type of base image, any other suitable information), and printing size information (the width and the length of a printing size a user wants to print). The order configuration information use any suitable programming language. In some examples, the markup language may be the XML. However, the markup language is not limited to an XML. It may be the SGML, the XHTML, the XHTML, or any other suitable markup language to provide the order configuration information to other systems. In some examples, the printing agent 120 may place the plurality of RIP orders on a certain memory space (e.g., RIP input folder 114) for the RIP software to read and process the plurality of RIP orders. In another example, the printing agent 120 may transmit the plurality of RIP orders to the RIP software 130 via a wired or wireless network. The remaining steps or processes to perform printing with a reduced image file size of a printing image along with a repetition function may be substantially the same as the steps or processes elaborated above.

Figure 3:
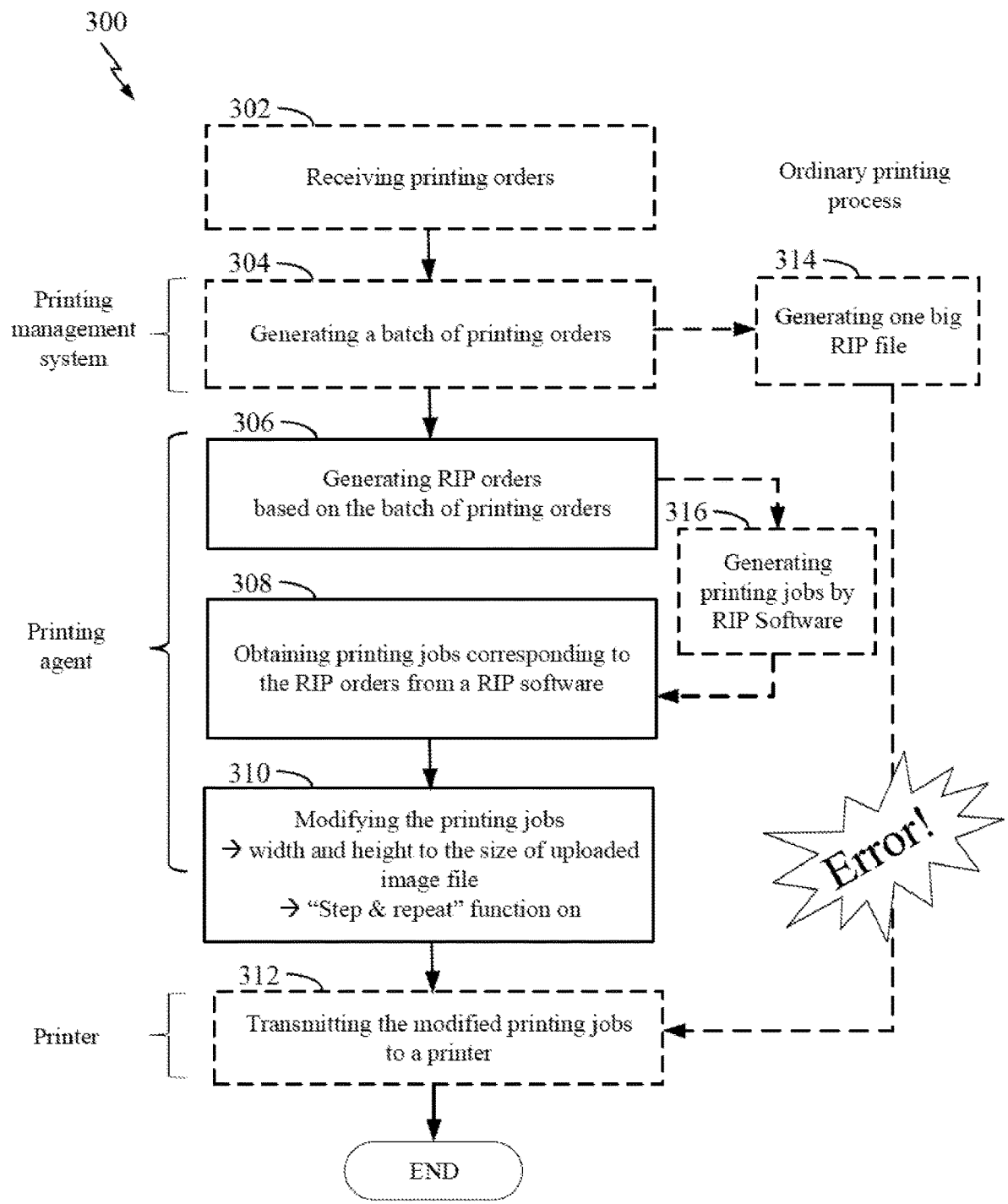
FIG. 3 is a flow chart illustrating an exemplary process for reducing a printing image file size.

FIG. 3 is a flow chart illustrating an exemplary process 300 for reducing a printing image file size in accordance with some aspects of the present disclosure. As described below, a particular implementation may omit some or all illustrated features and may not require some illustrated features to implement all embodiments. In some examples, any suitable apparatus or means for carrying out the functions or algorithm described below may carry out the process 300.

At block 302, one or more users may upload a plurality of printing orders using an external ordering system 101. A printing order may include at least one of: printing size information, a base image, or a type of printing substrate. The printing size information may include a width and/or length of the total size of a printing image to be printed. The printing image is the whole image a user wants to print. The base image may be a unit image to be printed with its copies in the printing image. The base image may include a base image file and/or base image size information (e.g., a width and/or a length of the base image). The base image may be repeated on a printing substrate based on the base image size information and the printing size information. For example, the base image file may include but is not limited to: a JPEG file, a PNG file, a TIFF file, a PDF file, a PSD file, an AI file, or an Indd file. The type of printing substrate may include, but is not limited to, fabric, paper, or any other suitable printing substrate. The plurality of printing orders may be categorized and separately printed based on the type of printing substrate. The external ordering system 101 may include, but is not limited to, an email system 102, a website 104, a digital platform 106, or any other suitable medium to provide a printing order to a printing agent 120. In some examples, different types of systems in the external ordering system 101 may provide the same types of data and files to the printing agent 120. The printing agent 120 may receive and forward the plurality of printing orders to a printing management system 110.

At block 304, a printing management system 110 may receive the plurality of printing orders and generate a batch based on the plurality of printing orders. The printing management system 110 may combine the plurality of printing orders to generate a batch based on the plurality of printing orders. The batch may further include a batch configuration information about the batch and the plurality of printing orders. The printing management system 110 may transmit the batch to the printing agent 120. In some examples, the printing management system 110 may place the batch to a certain memory space (e.g., a printing management system output folder 112).

At block 314, in an ordinary printing process, the batch of the plurality of printing orders may be transmitted to a raster image processor (RIP) software 130 as a whole. The RIP software may generate one printing raster image combining all of the plurality of printing orders. In some examples, the printing raster image may be too big for a printer 140 to process it. This may result in an error at the RIP software 130 and/or the printer 140.

At block 306, rather than transmitting the batch as a whole to the RIP software 130 and/or the printer 140, the printing agent 120 may generate a plurality of RIP orders corresponding to the plurality of printing orders based on the batch. In some examples, a RIP order may include a corresponding printing order and order configuration information about the corresponding printing order. In some examples, a RIP order may include a base image and/or printing size information of a corresponding printing order. The order configuration information may use a markup language (e.g., XML, SGML, HTML, XHTML, or any other suitable metadata language) to communicate with the RIP software 130. In some examples, the printing agent 120 may place the plurality of RIP orders on a certain memory space (e.g., RIP input folder 114) for the RIP software to read and process the plurality of RIP orders. In other example, the printing agent 120 may transmit the plurality of RIP orders to the RIP software 130 via a wired or wireless network.

At block 316, the RIP software 130 may obtain the plurality of RIP orders and generate a plurality of printing jobs corresponding to the plurality of RIP orders. A printing job may include, but is not limited to, a raster image and RIP configuration information. The RIP software 130 may convert the base image in a RIP with/without copies of the base image into a raster image which a printer 140 can read and process. The raster image may include several images having corresponding colors. In some examples, the RIP configuration information may contain information about a printing job. For example, the RIP configuration information may include, but is not limited to, base image information, printing size information, and/or color information. The base image information may include the base image, the size of the base image, and/or the type of the base image of the corresponding printing order. The base image information may include, but is not limited to, a base image file, a width and length of the base image file, and/or a type of the base image file (e.g., JPEG, PNG, TIFF, PDF, PSD, AI, or INDD). The printing size information may include a width and length of a printing size that a user wants to print. The color information may include color separation information with various colors (e.g., black, cyan, magenta, yellow, red, green, and/or lightblack). The RIP configuration information may use a markup language (e.g., XML, SGML, HTML, XHTML, or any other suitable metadata language) to communicate with other homogeneous or heterogeneous systems. In some examples, the RIP software 130 may place a printing job to a certain memory space (e.g., a RIP output folder 116) where the printer 140 may access and process the printing job. In a certain embodiment, the RIP output folder 116 may be the same as or different from a printer input folder 118 where the printer 140 may access and process the printing job.

At block 310, the printing agent may modify the plurality of printing jobs such that a printing size of each printing job of the plurality of printing jobs is adjusted based on a size of the base image of the printing order. A printing job may correspond to a respective printing order of the plurality of printing orders. The printing job may include the base image and the printing size information of a corresponding printing order. In some examples, the printing agent 120 may modify the printing job by modifying the RIP configuration information of the printing job. By modifying the RIP configuration information, the base image of the printing job may be repeated based on the printing size information of the printing job. That is, the printing size of the printing job may be reduced to the size of the base image of the printing job. In addition, the printing agent 120 may add repetition information about how many the base image is repeated. That repetition information may include the number of repetitions in width and length. In some examples, the printing agent 120 may enable a repetition mode (e.g., a step & repeat function). The printing agent 120 may determine the number of repetitions in width and length of the base image based on the printing size information (e.g., a width and/or length of total size of the printing image). The printing agent 120, then, may add or modify the determined repetition information in the RIP configuration information. In some examples, the printing agent 120 may further modify the RIP configuration information for seamless repetition by setting drop information. The drop is either a distance or a fraction. For example, a ⅓ vertical drop may indicate that the next repetition of a base image may be place right to the previous pattern with a drop of a third down of the base image. The printing agent 120 may determine a number of drops (e.g., ½, ⅓) and a direction (e.g., horizontal or vertical) for seamless repetitions of the base image. In some examples, a user may indicate the drop information through the external ordering system 101.

At block 312, the printing agent 120 may transmit the modified plurality of printing jobs to the printer 140. The modified plurality of printing jobs may have a substantially reduced file size because the printing jobs may not have a whole printing image but instead may comprise a small base image with repetition information.

Figure 4:
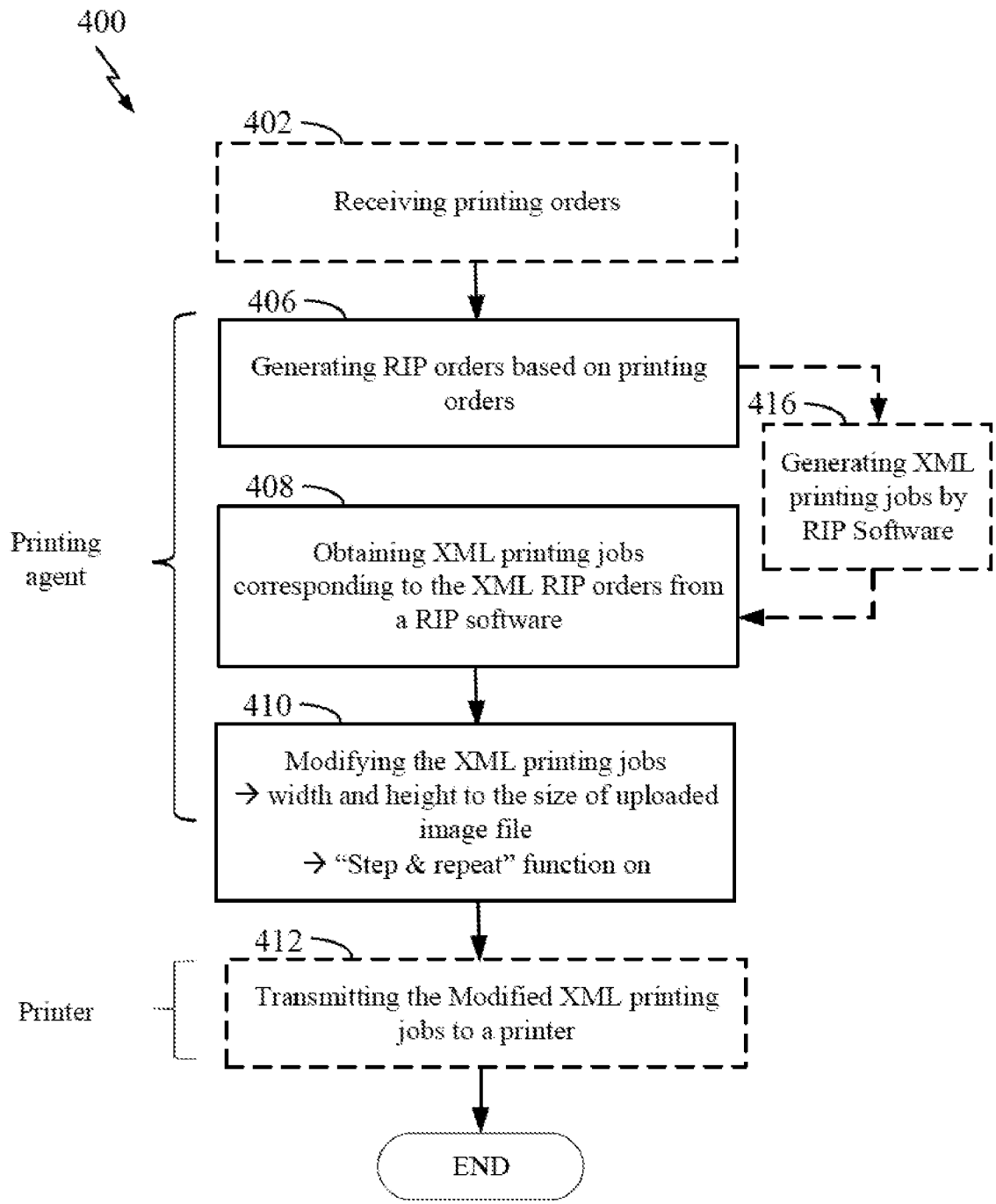
FIG. 4 is a flow chart illustrating another exemplary process for reducing a printing image file size.

FIG. 4 is a flow chart illustrating another exemplary process 300 for reducing a printing image file size in accordance with some aspects of the present disclosure. As shown in FIG. 2, at block 406, the printing agent 220 may receive a plurality of printing orders directly from the external ordering system 201. Based on the plurality of printing orders, the printing agent 220 may generate a plurality of corresponding RIP orders for a RIP software 230 to process the plurality of printing orders. A RIP order may include a base image, printing size information, and/or a type of a printing substrate of a corresponding printing order of the plurality of printing orders. The RIP order may further include order configuration information for the RIP software 230 to read and understand the RIP order. The order configuration information may include information about the RIP order including, but not limited to, base image information (e.g., a base image, a size of the base image, a type of base image, any other suitable information), and printing size information (the width and the length of a printing size a user wants to print). In some examples, the printing agent 120 may place the plurality of RIP orders on a certain memory space (e.g., RIP input folder 114) for the RIP software to read and process the plurality of RIP orders. In other example, the printing agent 120 may transmit the plurality of RIP orders to the RIP software 130 via a wired or wireless network. The remaining steps or processes to perform printing with a reduced image file size of a printing image along with a repetition function may be substantially the same as the steps or processes elaborated above.

Figure 5:
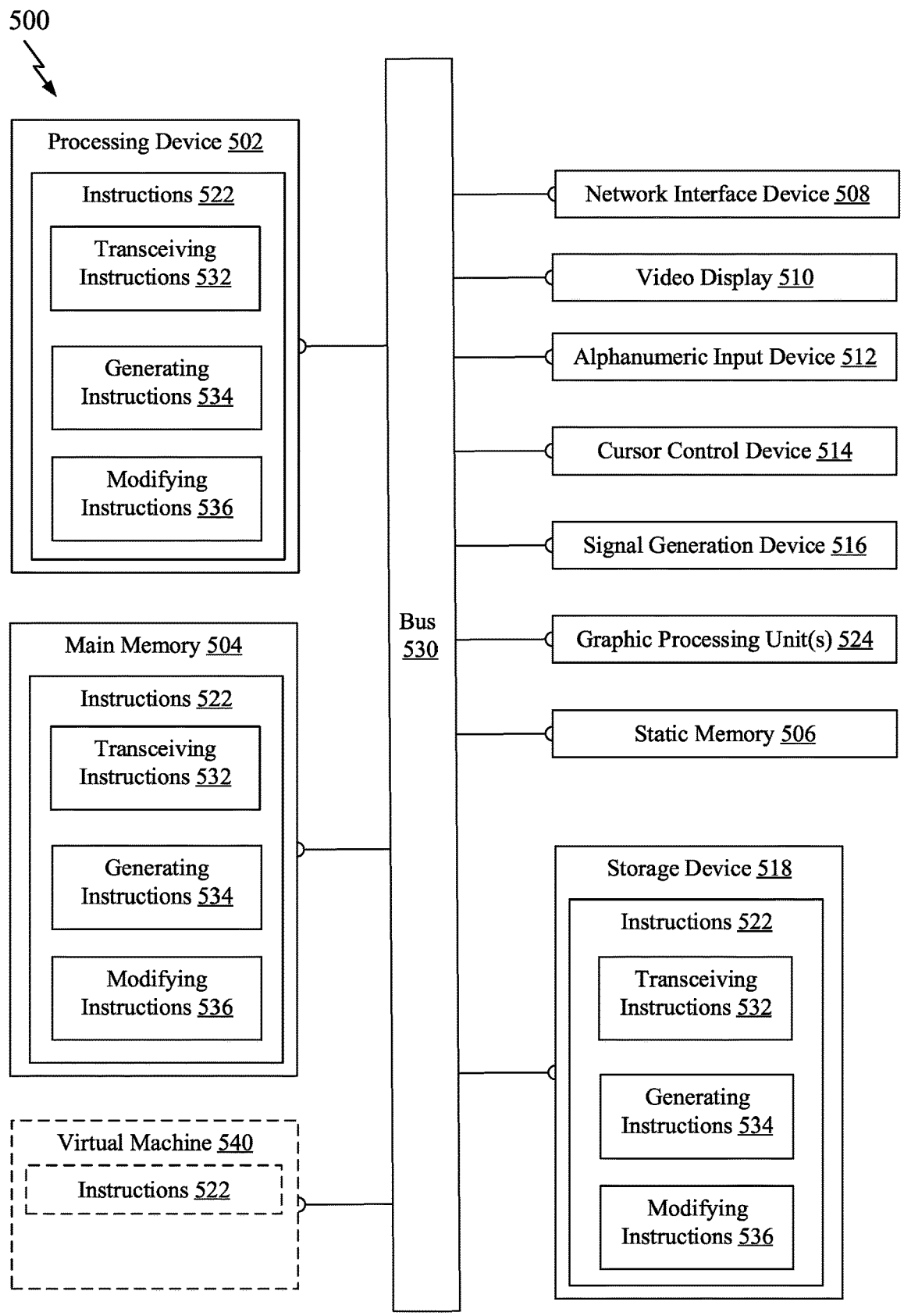
FIG. 5 is a block diagram conceptually illustrating an example of a hardware implementation for the methods disclosed herein.

FIG. 5 is a block diagram conceptually illustrating an example machine of a computer system 500 within which a set of instructions, for causing the machine to perform any one or more of the methods disclosed herein, may be executed. In alternative implementations, the machine may be connected (such as networked) to other machines in a LAN, an intranet, an extranet, and/or the Internet.

The machine may operate in the capacity of a server or a client machine in a client-server network environment, as a peer machine in a peer-to-peer (or distributed) network environment, or as a server or a client machine in a cloud computing infrastructure or environment. The machine may be a server computer, a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methods discussed herein.

The example computer system 500 includes a processing device 502, a main memory 504 (such as read-only memory (ROM), flash memory, dynamic random access memory (DRAM) such as synchronous DRAM (SDRAM) or DRAM, etc.), a static memory 506 (such as flash memory, static random access memory (SRAM), etc.), and a data storage device 518, which communicate with each other via a bus 530.

Processing device 502 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 502 is configured to execute instructions 522 for performing the operations and steps discussed herein.

The computer system 500 may further include a network interface device 908 for connecting to the LAN, intranet, internet, and/or the extranet. The computer system 500 also may include a video display unit 510 (such as a liquid crystal display (LCD) or a cathode ray tube (CRT)), an alphanumeric input device 512 (such as a keyboard), a cursor control device 514 (such as a mouse), a signal generation device 516 (such as a speaker), and a graphic processing unit 524 (such as a graphics card).

The data storage device 518 may be a machine-readable storage medium 528 (also known as a computer-readable medium) on which is stored one or more sets of instructions or software 522 embodying any one or more of the methods or functions described herein. The instructions 522 may also reside, completely or at least partially, within the main memory 504 and/or within the processing device 502 during execution thereof by the computer system 500, the main memory 504 and the processing device 902 also constituting machine-readable storage media.

In one implementation, the instructions 522 include transceiving instructions for receiving a plurality of printing orders from an external ordering system at block 302 of FIG. 3 and block 402 at FIG. 4, obtaining a plurality of printing jobs corresponding to the RIP orders from a RIP software at block 308 of FIG. 3 and block 408 at FIG. 4, and/or transmitting modified printing jobs to a printer at block 312 of FIG. 3 and block 412 at FIG. 4. The instructions 522 may further include generating instructions 534 for generating a plurality of RIP orders based on the batch of printing orders at block 306 of FIG. 3 and block 406 at FIG. 4. The instructions 522 may further include modifying instructions 536 for modifying the printing jobs to reduce the printing image file size with base image repetition information at block 310 of FIG. 3 and block 410 of FIG. 4. While the machine-readable storage medium 518 is shown in an example implementation to be a single medium, the term "machine-readable storage medium" should be taken to include a single medium or multiple media (such as a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media. The term "machine-readable storage medium" shall accordingly exclude transitory storage mediums such as signals unless otherwise specified by identifying the machine readable storage medium as a transitory storage medium or transitory machine-readable storage medium.

In another implementation, a virtual machine 540 may include a module for executing instructions such as transceiving instructions 532, generating instructions 534, and/or modifying instructions 536. In computing, a virtual machine (VM) is an emulation of a computer system. Virtual machines are based on computer architectures and provide functionality of a physical computer. Their implementations may involve specialized hardware, software, or a combination of hardware and software.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "modifying" or "providing" or "calculating" or "determining" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices. The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (such as a computer). For example, a machine-readable (such as computer-readable) medium includes a machine (such as a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method for digital printing on one or more printers, comprising:
   receiving a plurality of printing orders, a printing order of the plurality of printing orders comprising a base image having a base length and a base width and printing size information;
   generating a plurality of raster image processor (RIP) orders based on the plurality of printing orders, a RIP order of the plurality of RIP orders including order configuration information including the base length and the base width of the printing order;

obtaining a plurality of printing jobs corresponding to the plurality of RIP orders, the plurality of printing jobs generated from a RIP software, a printing job of the plurality of printing jobs including the base length and the base width of the printing order;

modifying, at a printing agent separate from the RIP software and the one or more printers, the plurality of printing jobs such that a printing size of the printing job is adjusted based on a size of the printing size information of the printing order corresponding to the printing job of the plurality of printing jobs; and after the modifying step, transmitting the modified plurality of printing jobs to the one or more printers, wherein the modified printing job of the modified plurality of printing jobs is configured to instruct a printer of the one or more printers to repeat the base image of the printing order corresponding to the modified printing job based on the adjusted printing size of the modified printing job.

2. The method of claim 1, wherein the printing job comprises a raster image corresponding to the base image of the printing order, and wherein to instruct the printer of the one or more printers to repeat the base image, the modified printing job of the modified plurality of printing jobs is configured to instruct the printer of the one or more printers to repeat the raster image of the modified printing job based on the adjusted printing size of the modified printing job.

3. The method of claim 2, wherein the printing job further comprises RIP configuration file.

4. The method of claim 3, wherein the RIP configuration file uses a markup language.

5. The method of claim 4, the markup language comprises an extensible markup language (XML).

6. The method of claim 3, wherein the modifying the plurality of printing jobs comprises:

modifying the RIP configuration file of the printing job to include a number of repetitions of the base image of the printing order based on the printing size information.

7. The method of claim 3, wherein the modifying the plurality of printing jobs comprises:

modifying the RIP configuration file of the printing job to include the printing size information of the printing order.

8. The method of claim 7, wherein the printing size information of the printing order comprises a width of a total size of a printing image.

9. The method of claim 7, wherein the printing size information of the printing order comprises a length of a total size of a printing image.

10. The method of claim 1, wherein the transmitting the plurality of printing jobs comprises: moving the modified plurality of printing jobs to a memory space.

11. The method of claim 10, wherein the one or more printers load the plurality of printing jobs from the memory space.

12. The method of claim 1, wherein the RIP order of the plurality of RIP orders is generated based on the base image of the printing order of the plurality of printing orders.

13. The method of claim 1, wherein the printing order further comprises a type of printing substrate.

14. The method of claim 13, wherein the modified printing job is transmitted to the printer based on the type of printing substrate of the printing order.

15. A method for digital printing on one or more printers, comprising:

receiving a plurality of printing orders, a printing order of the plurality of printing orders comprising a base image having a base length and a base width and printing size information;

transmitting the plurality of printing orders to a printing management system generating a batch based on the plurality of printing orders;

generating a plurality of raster image processor (RIP) orders corresponding to the plurality of printing orders based on the batch, a RIP order of the plurality of RIP orders including order configuration information including the base length and the base width of the printing order;

obtaining a plurality of printing jobs corresponding to the plurality of RIP orders, the plurality of printing jobs generated from a RIP software, a printing job of the plurality of printing jobs including the base length and the base width of the printing order;

modifying, at a printing agent separate from the RIP software and the one or more printers, the plurality of printing jobs such that a printing size of the printing job of the plurality of printing jobs is adjusted based on a size of the printing size information of the printing order corresponding to the printing job of the plurality of printing jobs; and after the modifying step, transmitting the modified plurality of printing jobs to the one or more printers, wherein the modified printing job of the modified plurality of printing jobs is configured to instruct a printer of the one or more printers to repeat the base image of the printing order corresponding to the modified printing order based on the printing size information of the modified printing job.

16. The method of claim 15, wherein the RIP order of the plurality of RIP orders is generated based on the base image of the printing order of the plurality of printing orders.

17. The method of claim 15, wherein the printing job comprises a raster image corresponding to the base image of the printing order, and wherein to instruct the printer of the one or more printers to repeat the base image, the modified printing job of the modified plurality of printing jobs is configured to instruct the printer of the one or more printers to repeat the raster image of the modified printing job based on the adjusted printing size of the modified printing job.

18. The method of claim 17, wherein the printing job further comprises RIP configuration file.

19. The method of claim 18, wherein the modifying the plurality of printing jobs comprises:

modifying the RIP configuration file of the printing job to include the printing size information of the printing order.

20. The method of claim 18, wherein the modifying the plurality of printing jobs comprises:

modifying the RIP configuration file of the printing job to include a number of repetitions of the base image of the printing order based on the printing size information.

21. The method of claim 15, wherein the printing order further comprises a type of printing substrate.

22. The method of claim 21, wherein the modified printing job is transmitted to the printer based on the type of printing substrate of the printing order.

23. A method for digital printing on one or more printers, comprising:
- receiving a plurality of printing orders, a printing order of the plurality of printing orders comprising a base image having a base length and a base width and printing size information including a printing size length and a printing size width;
- generating a plurality of raster image processor (RIP) orders based on the plurality of printing orders, a RIP order of the plurality of RIP orders including order configuration information including the base length and the printing size width of the printing order;
- obtaining a plurality of printing jobs corresponding to the plurality of RIP orders, the plurality of printing jobs generated from a RIP software, a printing job of the plurality of printing jobs including the base length and the printing size width of the printing order;
- modifying, at a printing agent separate from the RIP software and the one or more printers, the plurality of printing jobs such that a printing size of the printing job is adjusted based on the printing size length of the printing order corresponding to the printing job; and
- after the modifying step, transmitting the modified plurality of printing jobs to the one or more printers, whereby the modified printing job is configured to instruct a printer of the one or more printers to repeat the base image based on the printing size length of the printing order.

24. A method for digital printing on one or more printers, comprising:
- receiving a plurality of printing orders, each printing order comprising a base image having a base length and a base width and printing size information;
- generating a plurality of raster image processor (RIP) orders based on the plurality of printing orders, each RIP order comprising order configuration information including the base length and the base width;
- obtaining a plurality of printing jobs corresponding to the plurality of RIP orders, the plurality of printing jobs generated from a RIP software, each printing job comprising the base length and the base width;
- modifying, at a printing agent separate from the RIP software and the one or more printers, the plurality of printing jobs to provide step and repeat instructions; and
- after the modifying step, transmitting the modified plurality of printing jobs to the one or more printers, whereby the step and repeat instructions are configured to instruct the one or more printers to repeat the base images of the corresponding plurality of printing order based on the printing size information of the corresponding plurality of printing order.

* * * * *